United States Patent
Durocher et al.

(10) Patent No.: US 11,873,758 B1
(45) Date of Patent: Jan. 16, 2024

(54) GAS TURBINE ENGINE COMPONENT WITH INTEGRAL HEAT EXCHANGER

(71) Applicant: Pratt & Whitney Canada Corp., Longueuil (CA)

(72) Inventors: Eric S. Durocher, Boucherville (CA); Gabriel Naccache, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/976,397

(22) Filed: Oct. 28, 2022

(51) Int. Cl.
*F02C 7/141* (2006.01)
*F01D 9/04* (2006.01)

(52) U.S. Cl.
CPC .............. *F02C 7/141* (2013.01); *F01D 9/041* (2013.01)

(58) Field of Classification Search
CPC .... F02C 7/12; F02C 7/14; F02C 7/143; F02C 7/141; F01D 9/041
See application file for complete search history.

(56) References Cited

U.S. PATENT DOCUMENTS

| | | | |
|---|---|---|---|
| 5,313,778 A | 5/1994 | Sweet | |
| 10,422,233 B2* | 9/2019 | Spangler | F23R 3/002 |
| 10,975,770 B1 | 4/2021 | Simpson | |
| 11,274,602 B2 | 3/2022 | Olver | |
| 11,549,376 B2* | 1/2023 | Jonnalagadda | C25D 1/02 |
| 2006/0042223 A1* | 3/2006 | Walker | F01D 9/065 60/39.08 |
| 2017/0321570 A1 | 11/2017 | Scothern | |
| 2018/0087392 A1* | 3/2018 | Chalaud | F01D 9/041 |
| 2020/0284160 A1* | 9/2020 | Zaccardi | F01D 25/162 |
| 2021/0115854 A1* | 4/2021 | Pikovsky | F02C 7/14 |
| 2021/0123352 A1* | 4/2021 | Townes | B33Y 80/00 |
| 2021/0270190 A1 | 9/2021 | Duranleau-Hendrickx | |
| 2022/0412260 A1* | 12/2022 | Ellbrant | F01D 25/18 |

FOREIGN PATENT DOCUMENTS

CA 1187809 A 5/1985

OTHER PUBLICATIONS

EP search report for EP23176539.7 dated Oct. 24, 2023.

* cited by examiner

*Primary Examiner* — Todd E Manahan
*Assistant Examiner* — Rodolphe Andre Chabreyrie
(74) *Attorney, Agent, or Firm* — Getz Balich LLC (57) ABSTRACT

An apparatus is provided for a gas turbine engine. This apparatus includes a vane array and a heat exchanger integrated with the vane array. The vane array includes an inner platform, an outer platform and a plurality of vanes. The inner platform extends circumferentially about a centerline and forms an inner peripheral boundary of a flowpath through the vane array. The outer platform extends circumferentially about the centerline and forms an outer peripheral boundary of the flowpath through the vane array. The vanes extend across the flowpath between the inner platform and the outer platform. The heat exchanger includes a passage following a tortuous trajectory along a first wall of the vane array.

17 Claims, 10 Drawing Sheets

GAS TURBINE ENGINE COMPONENT WITH INTEGRAL HEAT EXCHANGER

TECHNICAL FIELD

This disclosure relates generally to a gas turbine engine and, more particularly, to a heat exchanger for the gas turbine engine.

BACKGROUND INFORMATION

A gas turbine engine may include a heat exchanger such as a cooler (e.g., a pre-cooler, an intercooler, etc.) for cooling compressed air bled from an engine flowpath. A typical cooler is a standalone device arranged outside of a core of the gas turbine engine and mounted to an engine case via mounting brackets. While known coolers have various advantages, there is still room in the art for improvement. There is a need in the art, for example, for a cooler with a reduced impact on gas turbine engine size, weight and/or cost.

SUMMARY

According to an aspect of the present disclosure, an apparatus is provided for a gas turbine engine. This apparatus includes a vane array and a heat exchanger integrated with the vane array. The vane array includes an inner platform, an outer platform and a plurality of vanes. The inner platform extends circumferentially about a centerline and forms an inner peripheral boundary of a flowpath through the vane array. The outer platform extends circumferentially about the centerline and forms an outer peripheral boundary of the flowpath through the vane array. The vanes extend across the flowpath between the inner platform and the outer platform. The heat exchanger includes a passage following a tortuous trajectory along a first wall of the vane array.

According to another aspect of the present disclosure, another apparatus is provided for a gas turbine engine. This apparatus includes a compressor section component, and the compressor section component includes a wall and a heat exchanger. The wall extends axially along and circumferentially about a centerline. The wall is radially between and at least partially forms a core flowpath through the compressor section and the heat exchange passage. The heat exchange passage includes a first passage segment, a second passage segment and a third passage segment. The second passage segment is fluidly coupled between the first passage segment and the third passage segment. The second passage segment axially overlaps and is circumferentially between the first passage segment and the third passage segment.

According to still another aspect of the present disclosure, another apparatus is provided for a gas turbine engine. This apparatus includes a vane array and a heat exchanger integrated with the vane array. The vane array includes an inner platform, an outer platform and a plurality of vanes. The inner platform extends circumferentially about a centerline and forms an inner peripheral boundary of a flowpath through the vane array. The outer platform extends circumferentially about the centerline and forms an outer peripheral boundary of the flowpath through the vane array. The vanes extend across the flowpath between the inner platform and the outer platform. The heat exchanger includes a passage extending along and formed by the outer platform and a first of the vanes.

The compressor section component may be configured as a vane array. The vane array may include an inner platform, an outer platform and a plurality of vanes. The vanes may extend through the flowpath between the inner platform and the outer platform. The outer platform may be configured as or otherwise include the wall.

The heat exchange passage may extend between an inlet and an outlet. The inlet may be radially outboard of the outlet.

The tortuous trajectory may be or include a serpentine trajectory.

The passage may include a first passage segment, a second passage segment and a third passage segment sequentially arranged along the tortuous trajectory. The second passage segment may overlap and may be between the first passage segment and the third passage segment.

The second passage segment may be parallel with the first passage segment and the third passage segment.

The second passage segment may axially overlap and may be circumferentially between the first passage segment and the third passage segment.

The second passage segment may axially overlap and may be radially between the first passage segment and the third passage segment.

The outer platform may be configured as or otherwise include the first wall.

A first of the vanes may be configured as or otherwise include the first wall.

The first wall may form a first exterior side surface of the first of the vanes. The first of the vanes may also include a second wall that forms a second exterior side surface of the first of the vanes. The passage may extend laterally within the first of the vanes between the first wall and the second wall.

The first wall may form an exterior side surface of the first of the vanes. The first of the vanes may also include a second wall that forms an interior surface of the first of the vanes. The passage may extend laterally within the first of the vanes between the first wall and the second wall.

The tortuous trajectory may spiral about an interior bore of the first of the vanes.

The inner platform may be configured as or otherwise include the first wall.

The heat exchanger may be configured to exchange heat energy through the first wall between a first gas flowing through the flowpath and a second gas flowing through the passage.

The vane array may also include a second wall and a plurality of dividers extending between the first wall and the second wall. The dividers may be arranged to provide the passage with the tortuous trajectory.

The apparatus may also include a compressor section. The compressor section may include a compressor stage downstream of the vane array along the flowpath. The passage may be configured to receive air compressed by the compressor stage and bled from the flowpath.

The passage may be fluidly coupled between a heat exchanger inlet and a heat exchanger outlet. The heat exchanger inlet may be disposed at an outer side of the vane array. The heat exchanger outlet may be disposed at an inner side of the vane array.

The present disclosure may include any one or more of the individual features disclosed above and/or below alone or in any combination thereof The foregoing features and the operation of the invention will become more apparent in light of the following description and the accompanying drawings.

DETAILED DESCRIPTION

Figure 1:
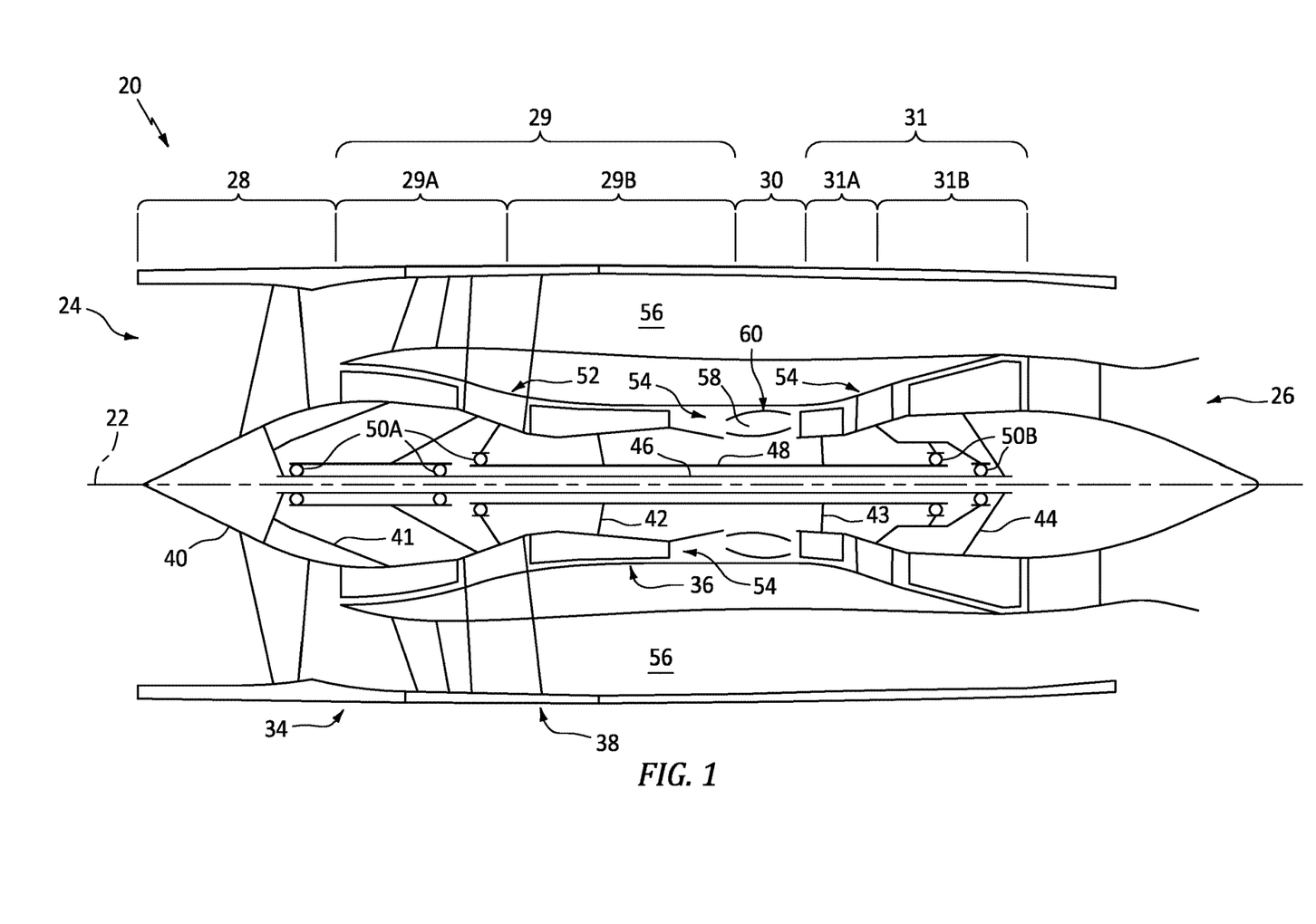
FIG. 1 is a schematic side sectional illustration of a gas turbine engine.

FIG. 1 is a schematic side sectional illustration of a gas turbine engine 20. This gas turbine engine 20 extends along an axial centerline 22 between an upstream airflow inlet 24 and a downstream airflow exhaust 26. The gas turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A-31B; e.g., a core of the gas turbine engine 20. The outer case 38 may house at least the fan section 28.

Each of the engine sections 28, 29A, 29B, 31A and 31B includes a respective bladed rotor 40-44. Each of these bladed rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 and the LPC rotor 41 are connected to and driven by the LPT rotor 44 through a low speed shaft 46. The HPC rotor 42 is connected to and driven by the HPT rotor 43 through a high speed shaft 48. The shafts 46 and 48 are rotatably supported by a plurality of bearings 50A and 50B (generally referred to as "50"); e.g., rolling element and/or thrust bearings. The forward bearings 50A may be connected to the inner case 36 by a first support structure, which first support structure may include an inter-compressor case (ICC) 52 between the LPC rotor 41 and the HPC rotor 42. The aft bearings 50B may be connected to the inner case 36 by a second support structure, which second support structure may include an inter-turbine case (ITC) 54 between the HPT rotor 43 and the LPT rotor 44. The present disclosure, however, is not limited to such an exemplary arrangement.

During operation, air enters the gas turbine engine 20 through the airflow inlet 24. This air is directed through the fan section 28 and into a core flowpath 54 and a bypass flowpath 56. The core flowpath 54 extends sequentially through the engine sections 29A, 29B, 30, 31A and 31B; e.g., the engine core. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a (e.g., annular) combustion chamber 58 of a (e.g., annular) combustor 60 in the combustor section 30. Fuel is injected into the combustion chamber 58 and mixed with the compressed core air to provide a fuel-air mixture. This fuel air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from an inlet to the core flowpath 54. The rotation of the LPT rotor 44 also drives rotation of the fan rotor 40, which propels bypass air through and out of the bypass flowpath 56. The propulsion of the bypass air may account for a majority of thrust generated by the gas turbine engine 20, e.g., more than fifty percent (50%) of engine thrust. The gas turbine engine 20 of the present disclosure, however, is not limited to the foregoing exemplary thrust ratio.

Figure 2:
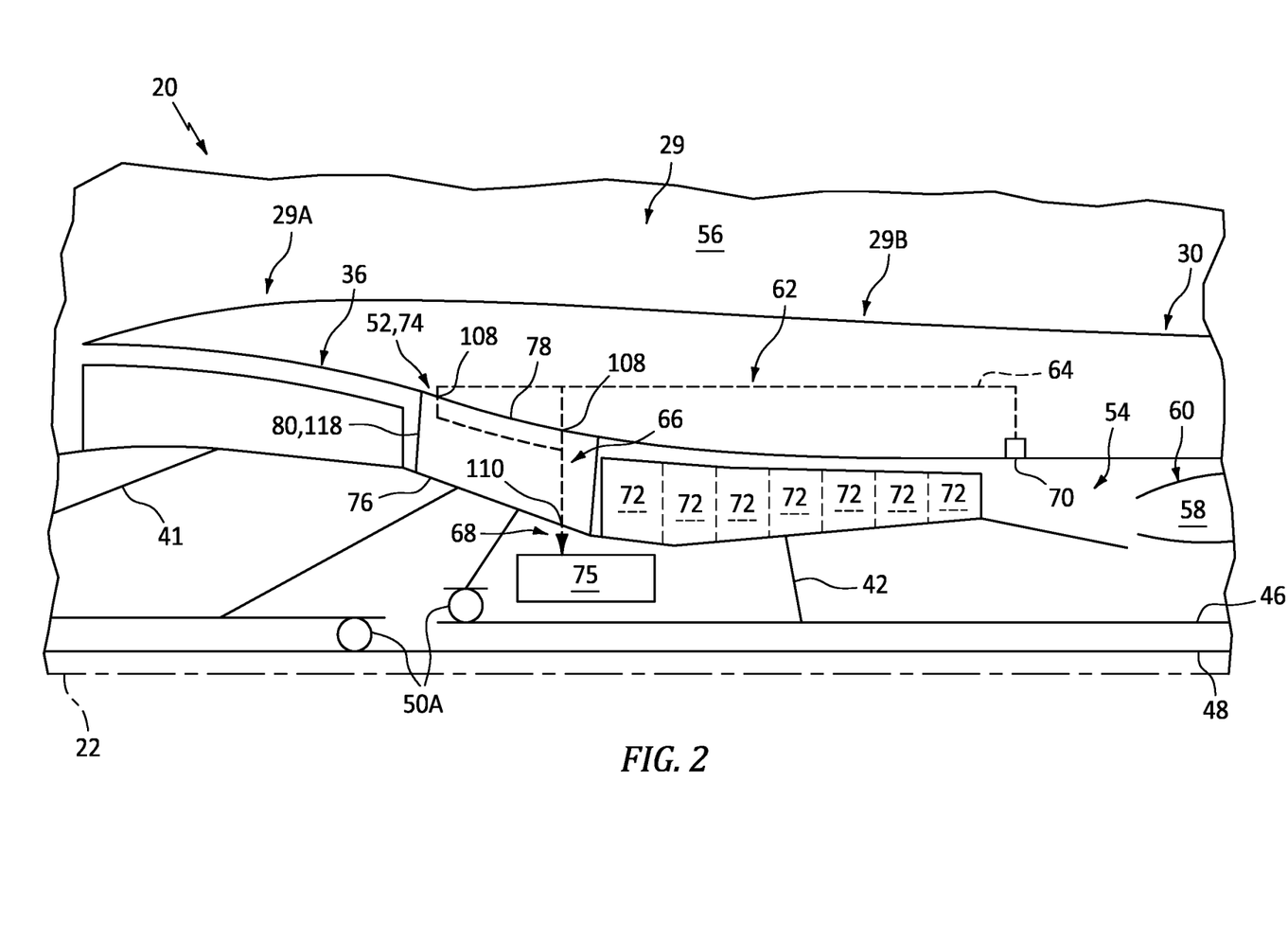
FIG. 2 is a schematic side sectional illustration of a portion of the gas turbine engine with a heat exchange system.

FIG. 2 schematically illustrates a heat exchanger system 62 arranged with the compressor section 29. This heat exchanger system 62 includes an inlet circuit 64, a heat exchanger 66 (schematically shown) and an outlet circuit 68.

The inlet circuit 64 is configured to provide a heat exchanger fluid to the heat exchanger 66. This heat exchange fluid may be compressed core air bleed from the core flowpath 54. The inlet circuit 64 of FIG. 2, for example, includes a bleed orifice 70 (or multiple bleed orifices) located downstream of the heat exchanger 66 along the core flowpath 54. The inlet circuit 64 is configured to bleed the compressed core air from the core flowpath 54 through the bleed orifice 70, and direct that bled compressed core air to the heat exchanger 66. The bleed orifice 70 may be disposed downstream of one or more or each stage 72 (e.g., array of blades) of HPC rotor 42; e.g., at a downstream end of the HPC rotor 42 along the core flowpath 54. The present disclosure, however, is not limited to such an exemplary inlet circuit arrangement.

The heat exchanger 66 is fluidly coupled with and between the inlet circuit 64 and the outlet circuit 68. The heat exchanger 66 is integrated with (e.g., configured as part of, configured in, combined with, etc.) another (e.g., internal) component of the gas turbine engine 20, which may reduce weight, space requirements and/or cost of the gas turbine engine 20. The heat exchanger 66 of FIG. 2, for example, is integrated with a vane array 74 (e.g., a nozzle) of the gas turbine engine 20. This vane array 74 of FIG. 2 is configured as part of the inter-compressor case 52. The present disclosure, however, is not limited to such an exemplary configuration. The engine vane array 74, for example, may be configured elsewhere along the core flowpath 54. Furthermore, another example of engine components with which the heat exchanger 66 may also or alternatively be integrated include, but are not limited to, a flowpath wall (e.g., a shroud) for the core flowpath 54 along the compressor section 29.

The heat exchanger 66 of FIG. 2 is configured to exchange heat energy between the compressed core air received from the inlet circuit 64 and the core air flowing through the engine vane array 74. More particularly, the heat exchanger 66 may facilitate a transfer of heat energy out of the relatively warm compressed core air received from the inlet circuit 64 into the relatively cool core air flowing through the engine vane array 74. The heat exchanger 66 may thereby cool the compressed core air received from the inlet circuit 64 to provide cooled air. Thus, the heat exchanger 66 of FIG. 2 operates as a cooler.

The outlet circuit 68 is configured to receive the cooled air from the heat exchanger 66, and provide that cooled air to one or more other components 75 of the gas turbine engine 20. Examples of the other component(s) 75 include, but are not limited to, one or more of the engine rotors 42-44, one or more of the bearings 50, and one or more seal devices within the engine core. Typically, these other component(s) 75 are disposed within the engine core and, more particularly, radially inboard of an outer peripheral boundary of the core flowpath 54 and/or the entire core flowpath 54. The present disclosure, however, is not limited to the foregoing example outlet circuit arrangement nor the foregoing exemplary component(s) receiving the cooled air.

Figure 3:
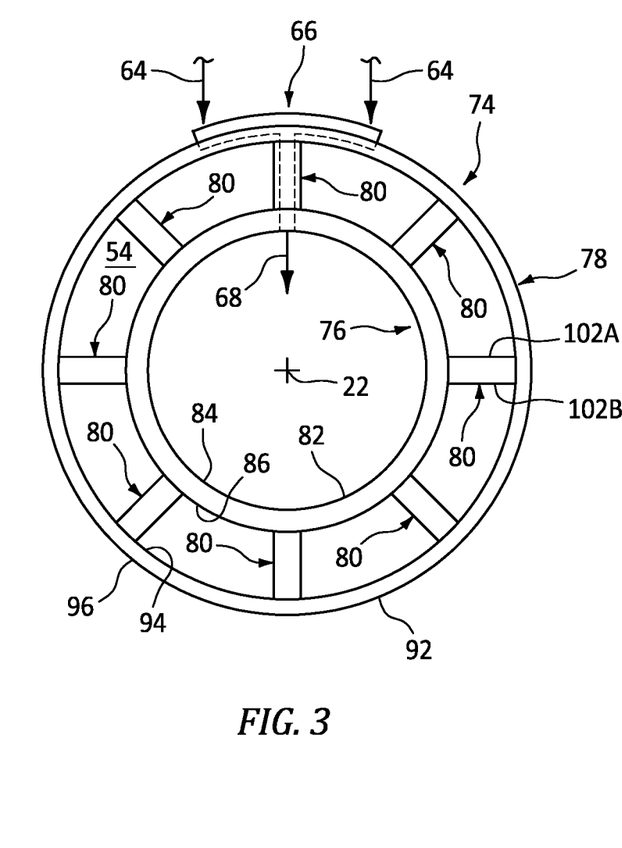
FIG. 3 is a schematic end view illustration of a vane array with an integral heat exchanger.
Figure 4:
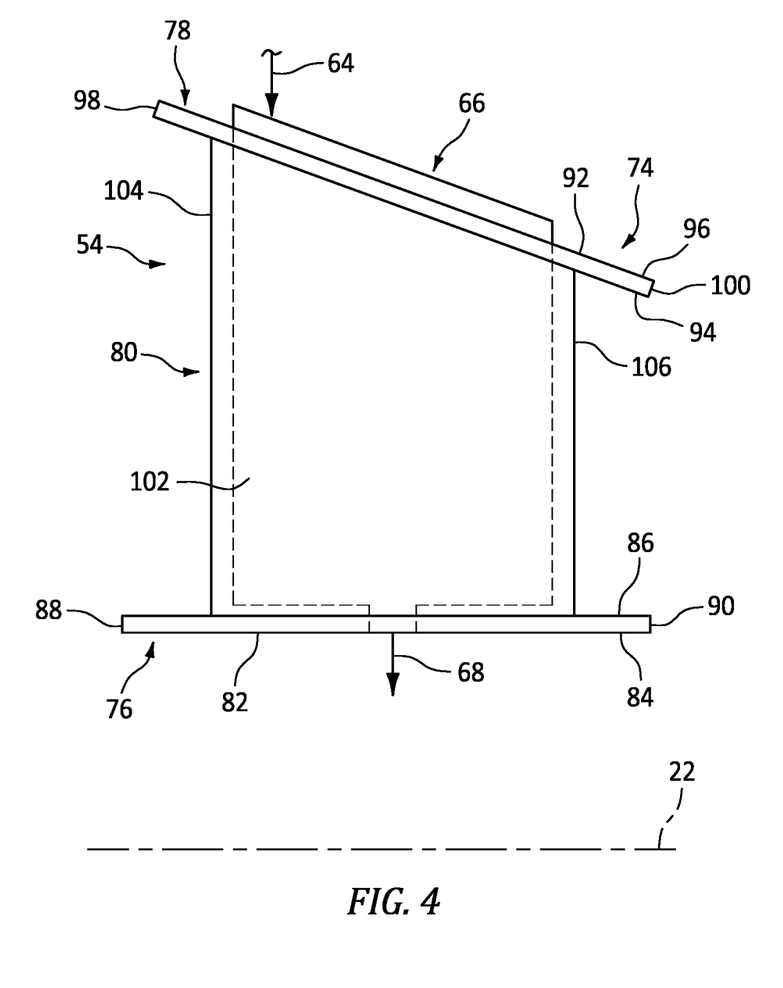
FIG. 4 is a schematic side sectional illustration of a portion of the vane array with the integral heat exchanger.

Referring to FIG. 3, the engine vane array 74 includes an inner platform 76, an outer platform 78 and a plurality of vanes 80; e.g., airfoil shaped struts. The inner platform 76 of FIG. 3 is configured as or otherwise includes an inner flowpath wall 82; e.g., an inner shroud. The inner platform 76 and its inner flowpath wall 82 extend circumferentially about (e.g., completely around) the axial centerline 22, which may thereby provide the inner platform 76/the inner flowpath wall 82 with a full-hoop (e.g., tubular) body. The inner flowpath wall 82 extends radially between and to an inner side 84 of the inner flowpath wall 82 and an outer side 86 of the inner flowpath wall 82. At the wall outer side 86, the inner flowpath wall 82 may form an inner peripheral boundary of the core flowpath 54 through the engine vane array 74. Referring to FIG. 4, the inner platform 76 and its inner flowpath wall 82 extend axially along the axial centerline 22 between and to an upstream end 88 of the inner platform 76 and a downstream end 90 of the inner platform 76.

The outer platform 78 of FIG. 3 is configured as or otherwise includes an outer flowpath wall 92; e.g., an outer shroud. The outer platform 78 and its outer flowpath wall 92 extend circumferentially about (e.g., completely around) the axial centerline 22, which may thereby provide the outer platform 78 / the outer flowpath wall 92 with a full-hoop (e.g., tubular) body. The outer flowpath wall 92 extends radially between and to an inner side 94 of the outer flowpath wall 92 and an outer side 96 of the outer flowpath wall 92. At the wall inner side 94, the outer flowpath wall 92 may form an outer peripheral boundary of the core flowpath 54 through the engine vane array 74. This outer flowpath wall 92 of FIG. 3 also circumscribes the inner flowpath wall 82 as well as the vanes 80. Referring to FIG. 4, the outer platform 78 and its outer flowpath wall 92 extend axially along the axial centerline 22 between and to an upstream end 98 of the outer platform 78 and a downstream end 100 of the outer platform 78.

The vanes 80 of FIG. 3 are arranged circumferentially about the axial centerline 22 in an array. Each of the vanes 80 extends radially between and to the inner flowpath wall 82 and the outer flowpath wall 92. Each of the vanes 80 is also connected to (e.g., formed integral with or otherwise attached to) the inner flowpath wall 82 and the outer flowpath wall 92. With this arrangement, each of the vanes 80 extends radially across the core flowpath 54 between the inner platform 76 and the outer platform 78. Each of the vanes 80 extends laterally (e.g., generally circumferentially) between opposing sides 102A and 102B (generally referred to as "102") of that vane 80. Referring to FIG. 4, each of the vanes 80 extends longitudinally (e.g., generally axially) between a leading edge 104 of that vane 80 and a trailing edge 106 of that vane 80, where the vane sides 102 extend longitudinally between and meet at the leading edge 104 and the trailing edge 106.

Figure 5:
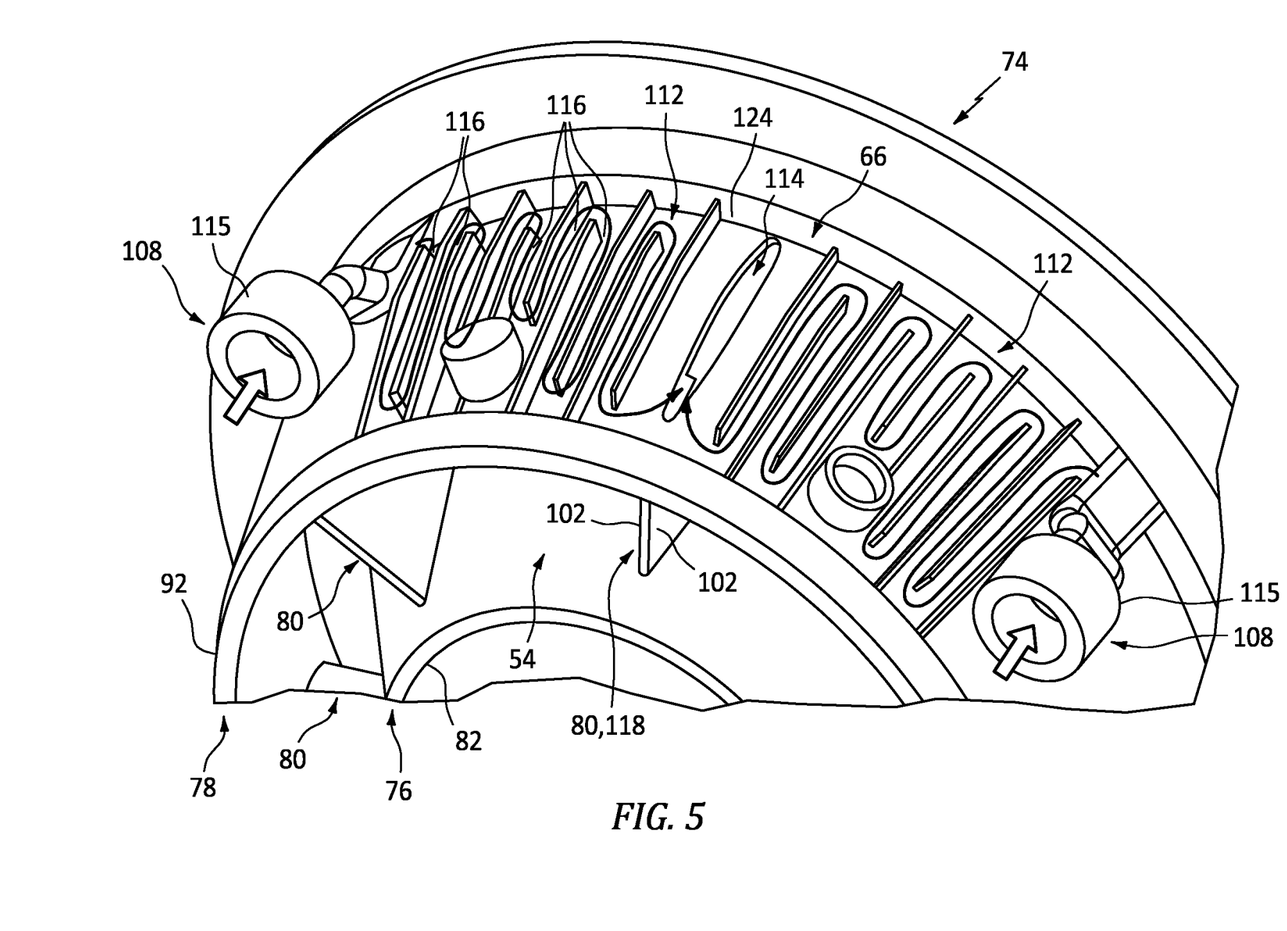
FIGS. 5-7 are partial perspective cutaway illustrations of the vane array with the integral heat exchanger.
Figure 6:
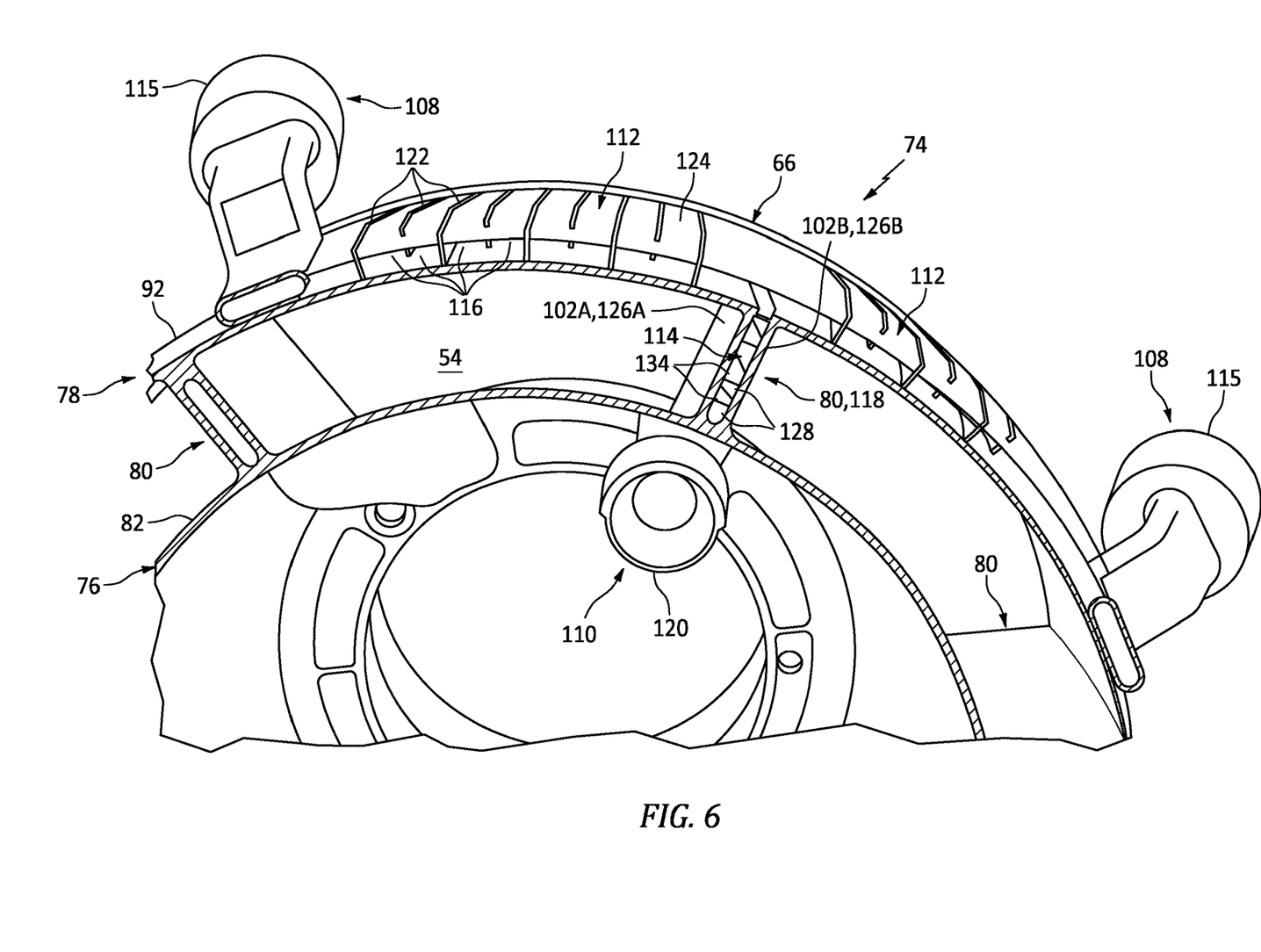
Figure 7:
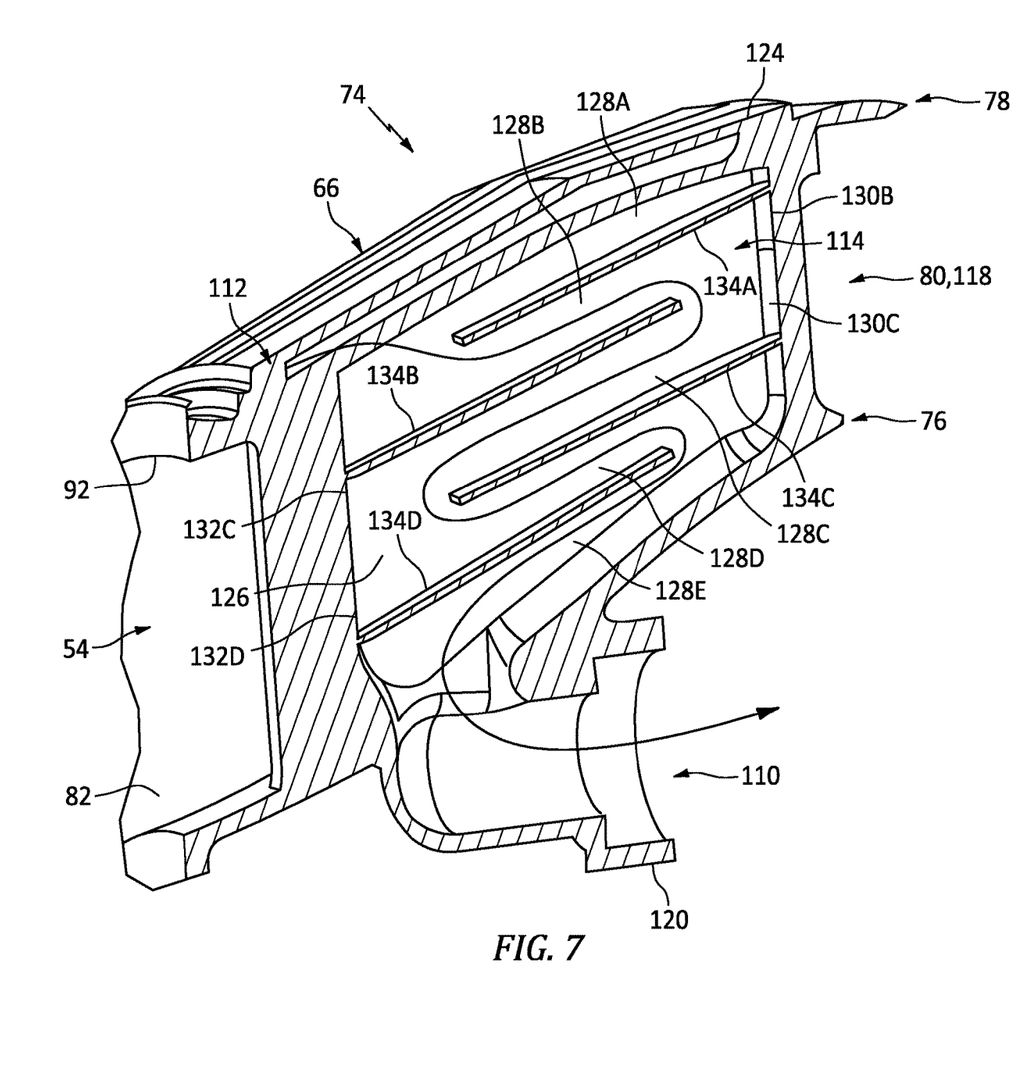

Referring to FIGS. 5-7, the heat exchanger 66 may be partially or completely integrated with (e.g., configured as part of) one or more vane array components (e.g., 76, 78 and/or 80). The heat exchanger 66 of FIGS. 5-7, in particular, includes one or more heat exchanger inlets 108, a heat exchanger outlet 110 and one or more heat exchanger passages 112 and 114 arranged (e.g., sequentially) between and fluidly coupled with the heat exchanger inlets 108 and the heat exchanger outlet 110.

Figure 8:
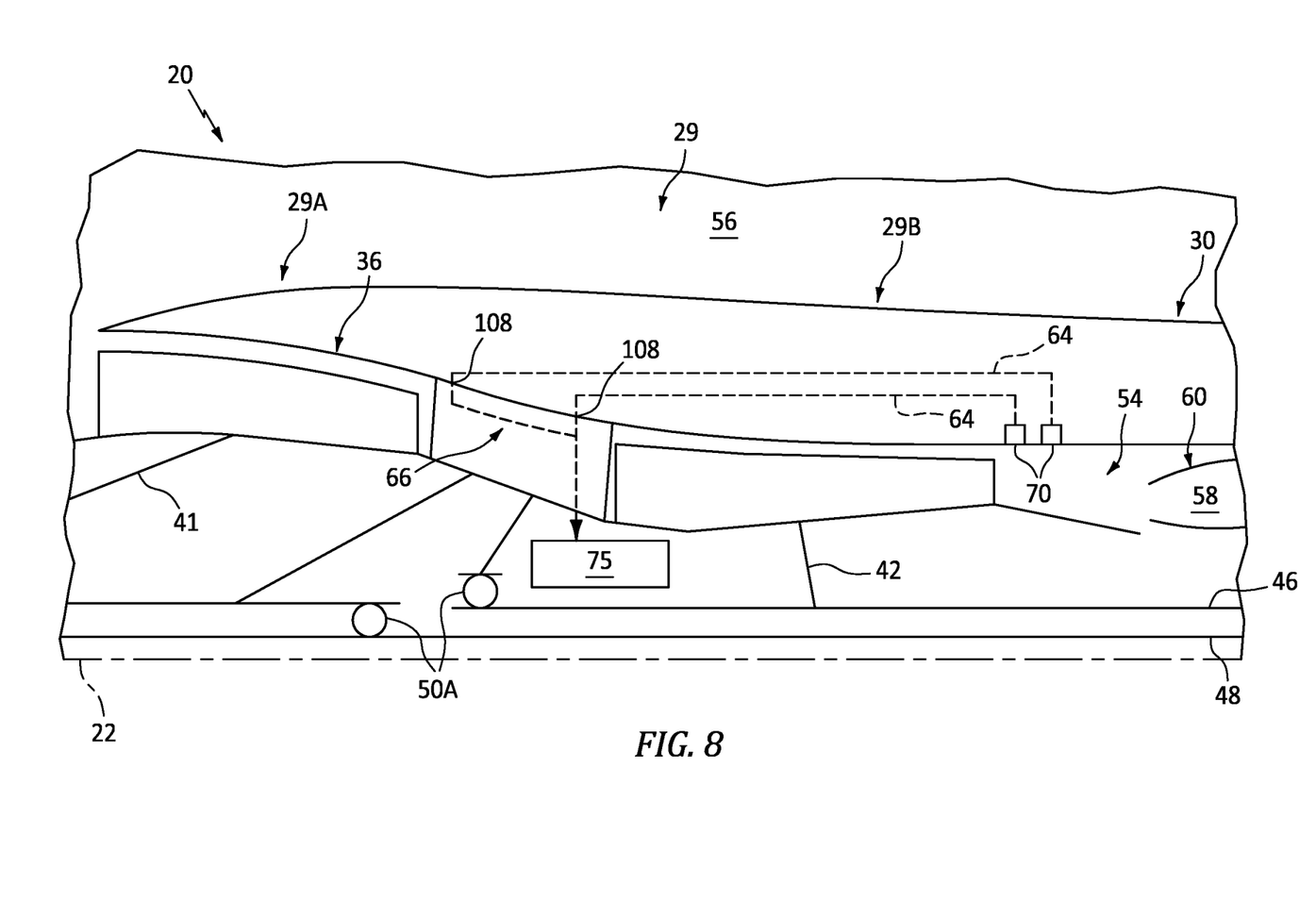
FIG. 8 is a schematic side sectional illustration of a portion of the gas turbine engine with another heat exchange system.

Referring to FIGS. 5 and 6, each heat exchanger inlet 108 may be disposed at a radial outer side of the engine vane array 74. Each heat exchanger inlet 108 of FIGS. 5 and 6, for example, is formed by a respective conduit fitting 115 projecting radially out from the outer platform 78. Each heat exchanger inlet 108 is fluidly coupled with and downstream of the inlet circuit 64 (see FIG. 2). Alternatively, each heat exchanger inlet 108 may be fluidly coupled with and downstream of a discrete inlet circuit 64; e.g., see FIG. 8. In the embodiments of FIGS. 5 and 6, the heat exchanger inlets 108 are disposed to opposing sides 102 of a respective one of the vanes 80; referred to below as a heat exchanger vane 118 for ease of description.

The heat exchanger outlet 110 may be disposed at a radial inner side of the engine vane array 74. The heat exchanger outlet 110 of FIGS. 6 and 7, for example, is formed by a conduit fitting 120 projecting radially in from the inner platform 76. The heat exchanger outlet 110 is fluidly coupled with and upstream of the outlet circuit 68 (see FIG. 2).

Referring to FIG. 5, the outer platform passages 112 are arranged with the outer platform 78 and its outer flowpath wall 92. Each of these outer platform passages 112 is fluidly coupled with and between a respective one of the heat exchanger inlets 108 and the vane passage 114.

Figure 9:
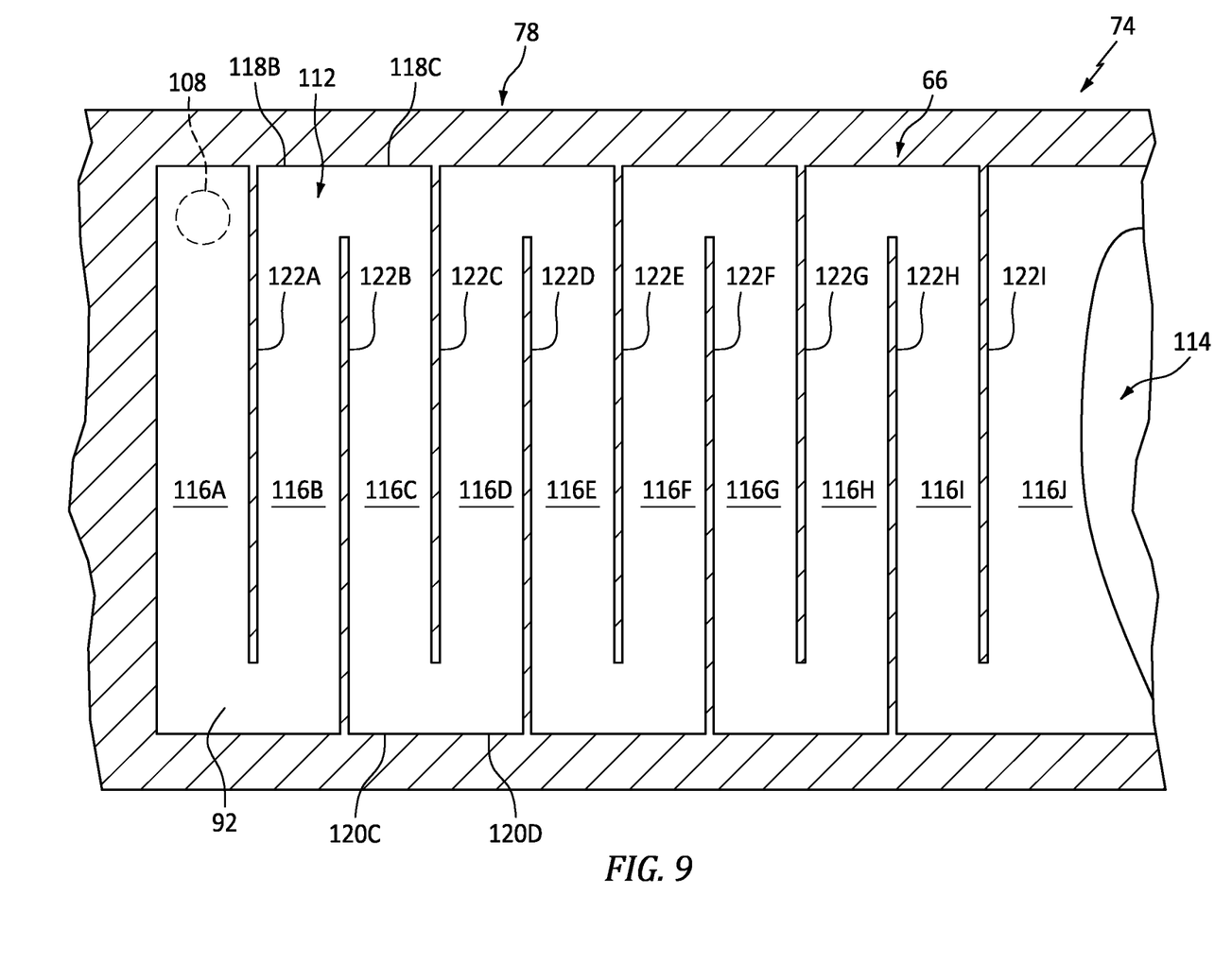
FIG. 9 is a sectional illustration through a portion of the heat exchanger.

Referring to FIG. 9, each outer platform passage 112 may follow a tortuous (e.g., serpentine, zig-zagged, wavy, etc.) trajectory along the outer flowpath wall 92. Each outer platform passage 112 of FIG. 9, for example, is formed by a plurality of interconnected passage segments 116A-J (generally referred to as "116"). These passage segments 116A-J are sequentially arranged along the respective passage trajectory. The passage segments 116A-J may be parallel with one another and/or may axially overlap one another. At least one of the passage segments 116 (e.g., 116C) is located circumferentially between a pair of neighboring (e.g., adjacent) passage segments (e.g., 116B and 116D). An axial first (e.g., forward or aft) end 118C of the passage segment 116C is fluidly coupled with a respective axial first (e.g., forward or aft) end 118B of the passage segment 116B. An axial second (e.g., aft or forward) end 120C of the passage segment 116C is fluidly coupled with a respective axial second 120D (e.g., aft or forward) end of the passage segment 116D. With this arrangement, the respective outer platform passage 112 reverses direction from the passage segment 116B to the passage segment 116C, and then the respective outer platform passage 112 reverses direction again from the passage segment 116C to the passage segment 116D.

Figure 10:
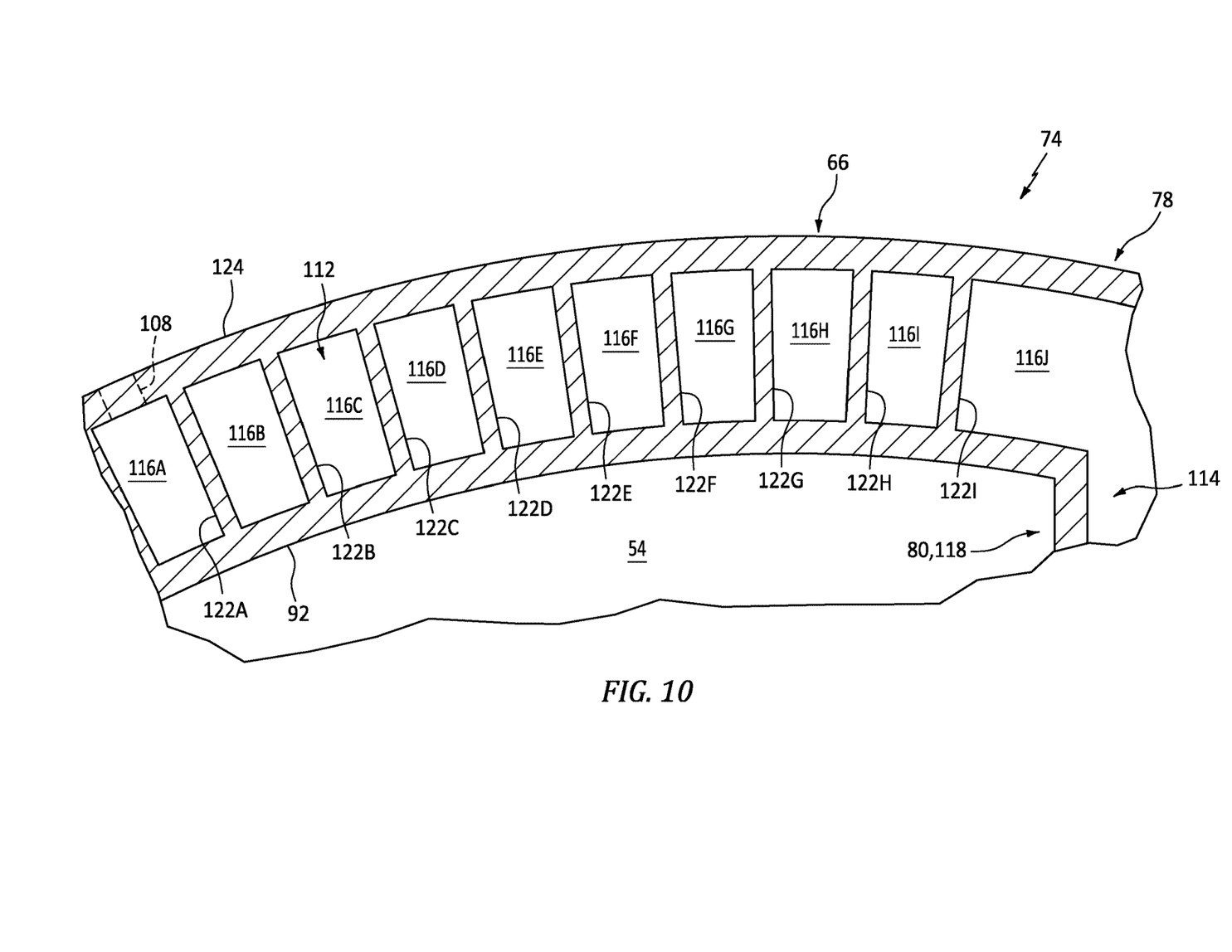
FIG. 10 is a cross-sectional illustration through another portion of the heat exchanger.

The passage segments 116 of a respective outer platform passage 112 may be formed by one or more dividers 122A-I; e.g., axially extending divider walls. Each of these dividers 122 may fluidly divide (e.g., separate, decouple, etc.) a circumferentially neighboring pair of the passage segments 116 along their (e.g., axial) lengths except, for example, at the respective ends where those passage segments 116 are fluidly coupled with one another. Referring to FIG. 10, each divider 122 also extends radially between and to the outer flowpath wall 92 and an exterior wall 124 of the engine vane array 74 and/or the heat exchanger 66. This exterior wall 124 overlaps a (e.g., arcuate) section of the outer flowpath wall 92 and covers the outer platform passages 112; see also FIG. 5. With such an arrangement, each outer platform passage 112 is formed radially by and between the outer flowpath wall 92 and the exterior wall 124. The heat exchanger 66 and its outer platform passages 112 may thereby be integrated with (e.g., embedded into) the engine vane array 74 and its outer platform 78.

Referring to FIG. 7, the vane passage 114 is arranged with and extends through the heat exchanger vane 118. The vane passage 114 is fluidly coupled with and between the outer platform passages 112 and the heat exchanger outlet 110.

The vane passage 114 may follow a tortuous (e.g., serpentine, zig-zagged, wavy, etc.) trajectory along opposing walls 126A and 126B (generally referred to as "126") (e.g., sidewalls) of the heat exchanger vane 118, where the vane wall 126A may form an exterior surface of the vane 118 at its side 102A, and where the vane wall 126B may form an opposing exterior surface of the vane 118 at its side 102B. The vane passage 114 of FIG. 7, for example, is formed by a plurality of interconnected passage segments 128A-E (generally referred to as "128"). These passage segments 128A-E are sequentially arranged along the passage trajectory. The passage segments 128A-E may be parallel with one another and/or may axially overlap one another. At least one of the passage segments 128 (e.g., 128C) is located radially between a pair of neighboring (e.g., adjacent) passage segments 128 (e.g., 128B and 128D). An axial first (e.g., forward or aft) end 130C of the passage segment 128C is fluidly coupled with a respective axial first (e.g., forward or aft) end 130B of the passage segment 128B. An axial second (e.g., aft or forward) end 132C of the passage segment 128C is fluidly coupled with a respective axial second (e.g., aft or forward) end 132D of the passage segment 128D. With this arrangement, the vane passage 114 reverses direction from the passage segment 128B to the passage segment 128C, and then the vane passage 114 reverses direction again from the passage segment 128C to the passage segment 128D.

The passage segments 128 of the vane passage 114 may be formed by one or more dividers 134A-D (generally referred to as "134"); e.g., axially extending divider walls. Each of these dividers 134 may fluidly divide (e.g., separate, decouple, etc.) a radially neighboring pair of the passage segments 128 along their (e.g., axial) lengths except, for example, at the respective ends where those passage segments 128 are fluidly coupled with one another. Referring to FIG. 6, each divider 134 also extends radially between and to the vane walls 126. With such an arrangement, the vane passage 114 is formed circumferentially by and between the vane walls 126. The heat exchanger 66 and its vane passage 114 may thereby be further integrated with (e.g., embedded into) the engine vane array 74 and its heat exchanger vane 118.

The dividers 122, 134 are described above as extending axially to provide axially extending passage segments 116, 128; e.g., see FIGS. 7 and 9. However, in other embodiments, one or more or all of the dividers 122, 134 may alternatively extend in another direction. The outer platform passage dividers 122, for example, may extend circumferentially to provide circumferentially extending passage segments 116 along the outer flowpath wall 92. In another example, the vane passage dividers 134 may extend radially to provide radially extending passage segments 128 within the heat exchanger vane 118.

Figure 11:
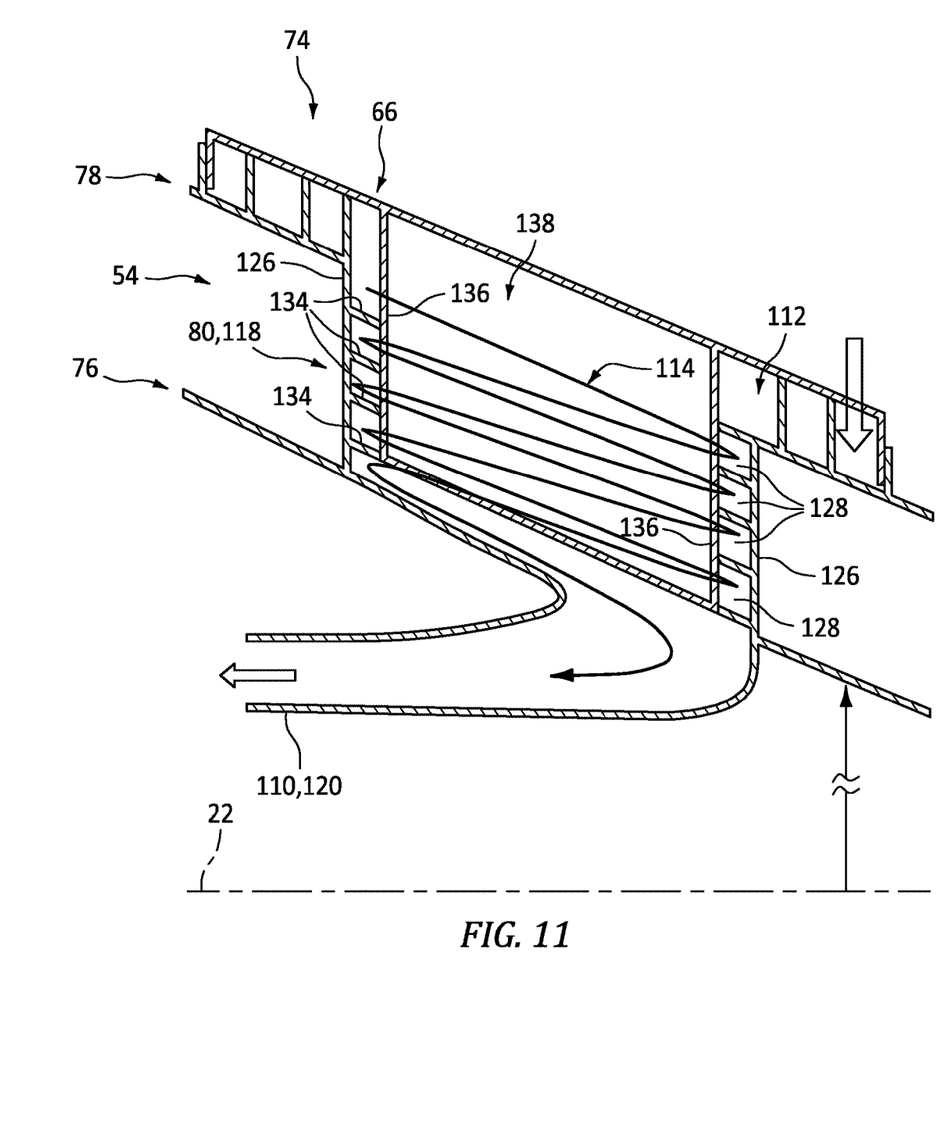
FIG. 11 is a schematic side sectional illustration of a portion of the vane array with another integral heat exchanger.

In some embodiments, referring to FIGS. 7 and 9, each heat exchange passage 112, 114 may be configured with a serpentine configuration. In other embodiments, one or more or all of the heat exchanger passages 112 and 114 may alternatively be configured with a spiral configuration. The vane passage 114 of FIG. 11, for example, may be formed between an exterior vane wall 126 of the heat exchanger vane 118 and an interior vane wall 136 of the heat exchanger vane 118. This vane passage 114 may spiral about an interior bore 138 within the heat exchanger vane 118 formed by the interior vane wall 136. With such an arrangement, the vane passage 114 extends laterally within the heat exchanger vane 118 between and to the exterior vane wall 126 and the interior vane wall 136.

In some embodiments, the heat exchanger 66 may be integrated (e.g. only) with the outer platform 78 and the heat exchanger vane 118 as described above. In other embodiments, however, the heat exchanger 66 may also or alternatively be integrated with the inner platform 76. The heat exchanger 66, for example, may include an inner platform passage (or passages) fluidly coupled between the vane passage 114 and the outlet circuit 68. The inner platform passage(s) may be integrated with the inner platform 76 in a similar or different manner as described above with respect to the integration of the outer platform passages 112 with the outer platform 78. In still other embodiments, the heat exchanger 66 may only include heat exchanger passage(s) in a select one of the vane arrange components 76, 78 and/or 80.

The heat exchanger system 62 and/or its heat exchanger 66 may be included in various gas turbine engines other than the one described above. The heat exchanger system 62 and/or its heat exchanger 66, for example, may be included in a geared gas turbine engine where a gear train connects one or more shafts to one or more rotors in a fan section, a compressor section and/or any other engine section. Alternatively, the heat exchanger system 62 and/or its heat exchanger 66 may be included in a direct drive gas turbine engine configured without a gear train. The heat exchanger system 62 and/or its heat exchanger 66 may be included in a gas turbine engine configured with a single spool, with two spools (e.g., see FIG. 1), or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a gas turbine engine, comprising:
a vane array including an inner platform, an outer platform and a plurality of vanes, the inner platform extending circumferentially about a centerline and forming an inner peripheral boundary of a flowpath through the vane array, the outer platform extending circumferentially about the centerline and forming an outer peripheral boundary of the flowpath through the vane array, and the plurality of vanes extending across the flowpath between the inner platform and the outer platform; and
a heat exchanger integrated with the vane array having a first inlet and a second inlet located on the outer platform, the heat exchanger comprising a passage following a tortuous trajectory along a first wall of the vane array, the passage extending between the first inlet and the second inlet, the passage including a first passage segment, a second passage segment and a third passage segment sequentially arranged along the tortuous trajectory, the second passage segment axially overlapping the first passage segment and the third passage segment as the second passage segment follows the tortuous trajectory, and the second passage segment circumferentially between the first passage segment and the third passage segment.

2. The apparatus of claim 1, wherein the second passage segment is parallel with the first passage segment and the third passage segment.

3. The apparatus of claim 1, wherein the outer platform comprises the first wall.

4. The apparatus of claim 1, wherein
the passage is a first passage, and the tortuous trajectory is a first tortuous trajectory; and
the heat exchanger further comprises a second passage fluidly coupled with and downstream of the first passage, the second passage follows a second tortuous trajectory along a first vane wall of a first of the plurality of vanes.

5. The apparatus of claim 4, wherein
the first vane wall forms a first exterior side surface of the first of the plurality of vanes;
the first of the plurality of vanes further comprises a second vane wall that forms a second exterior side surface of the first of the plurality of vanes; and
the second passage extends laterally within the first of the plurality of vanes between the first vane wall and the second vane wall.

6. The apparatus of claim 4, wherein
the first vane wall forms an exterior side surface of the first of the plurality of vanes;
the first of the plurality of vanes further comprises a second vane wall that forms an interior surface of the first of the plurality of vanes; and
the second passage extends laterally within the first of the plurality of vanes between the first vane wall and the second vane wall.

7. The apparatus of claim 4, wherein the second tortuous trajectory spirals about an interior bore of the first of the plurality of vanes.

8. The apparatus of claim 1, wherein the inner platform comprises the first wall.

9. The apparatus of claim 1, wherein the heat exchanger is configured to exchange heat energy through the first wall between a first gas flowing through the flowpath and a second gas flowing through the passage.

10. The apparatus of claim 1, wherein
the vane array further includes a second wall and a plurality of dividers extending radially between the first wall and the second wall; and
the plurality of dividers are arranged to provide the passage with the tortuous trajectory.

11. The apparatus of claim 10, wherein
the plurality of dividers comprises a first divider disposed circumferentially between the first passage segment and the second passage segment; and
the first divider extends axially along the first passage segment and the second passage segment.

12. The apparatus of claim 1, further comprising:
a compressor section comprising a compressor stage downstream of the vane array along the flowpath;
the passage configured to receive air compressed by the compressor stage and bled from the flowpath.

13. The apparatus of claim 1, wherein the passage is fluidly coupled between a heat exchanger inlet and a heat exchanger outlet;
the heat exchanger inlet is disposed at an outer side of the vane array; and
the heat exchanger outlet is disposed at an inner side of the vane array.

14. The apparatus of claim 1, wherein the passage is a first passage, the tortuous
trajectory is a first tortuous trajectory, and the heat exchanger further comprises a second passage and a third passage which is fluidly coupled with the first passage and the second passage in parallel;
the first passage is fluidly coupled between the first inlet into the heat exchanger and the third passage; the second passage is fluidly coupled between the second inlet into the heat exchanger and the third passage, and the second passage follows a second tortuous trajectory along the first wall of the vane array; and the third passage follows a third tortuous trajectory along a second wall of the vane array.

15. An apparatus for a gas turbine engine, comprising:
a compressor section component comprising a wall and a heat exchange passage, the heat exchange passage having a first inlet and a second inlet located on an outer platform of a vane array;
the wall extending axially along and circumferentially about a centerline, the wall radially between the compressor section and the heat exchange passage, the wall at least partially forming a core flowpath and the heat exchange passage, and the core flowpath extending through the compressor section; and the heat exchange passage extending serpentinelly between the first inlet and the second inlet, the heat exchange passage including a first passage segment, a second passage segment and a third passage segment, the second passage segment fluidly coupled between the first passage segment and the third passage segment, the second passage segment axially overlapping the first passage segment and the third passage segment, and the second passage segment circumferentially between the first passage segment and the third passage segment.

16. The apparatus of claim 15, wherein
the compressor section component is configured as a vane array including an inner platform, an outer platform and a plurality of vanes extending through the flowpath between the inner platform and the outer platform; and
the outer platform comprises the wall.

17. The apparatus of claim 15, wherein
the heat exchange passage extends between an inlet and an outlet; and
the inlet is radially outboard of the outlet.

\* \* \* \* \*